C. H. KNOBBS.
TENSION DEVICE FOR CAR TRUCKS.
APPLICATION FILED JULY 18, 1910.

995,470.

Patented June 20, 1911.

WITNESSES:
E. A. Pell
M. A. Johnson.

INVENTOR
Charles H. Knobbs
BY
Wm. H. Canfield
ATTORNEYS

UNITED STATES PATENT OFFICE.

CHARLES H. KNOBBS, OF ELIZABETH, NEW JERSEY, ASSIGNOR TO THE KNOBBS COMPANY, OF ELIZABETH, NEW JERSEY, A CORPORATION OF NEW JERSEY.

TENSION DEVICE FOR CAR-TRUCKS.

995,470. Specification of Letters Patent. Patented June 20, 1911.

Application filed July 18, 1910. Serial No. 572,465.

*To all whom it may concern:*

Be it known that I, CHARLES H. KNOBBS, a citizen of the United States, residing at Elizabeth, in the county of Union and State of New Jersey, have invented certain new and useful Improvements in Tension Devices for Car-Trucks; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved device which can be attached to a car truck and is adapted to extend forwardly and rearwardly from the truck to take up the strain, when the car is stopping or starting, so that the tortional strain on the car bolster is to a great extent removed.

The device is also adapted to be placed between the supports for the ends of the elliptical spring, used in car trucks, to normally draw the springs so that they resume their curved position when excessive weight is removed from them, and do not become flattened as is now the case.

The device is provided with means for adjusting its tension so that the spring which it contains can be compressed after it has become weakened so that it remains operative until its resiliency is about exhausted.

This device is adapted for any kind of truck, but I have illustrated it attached to a radial truck of the type illustrated and claimed in my Patent No. 956,900.

The invention is illustrated in the accompanying drawing, in which—

Figure 1:
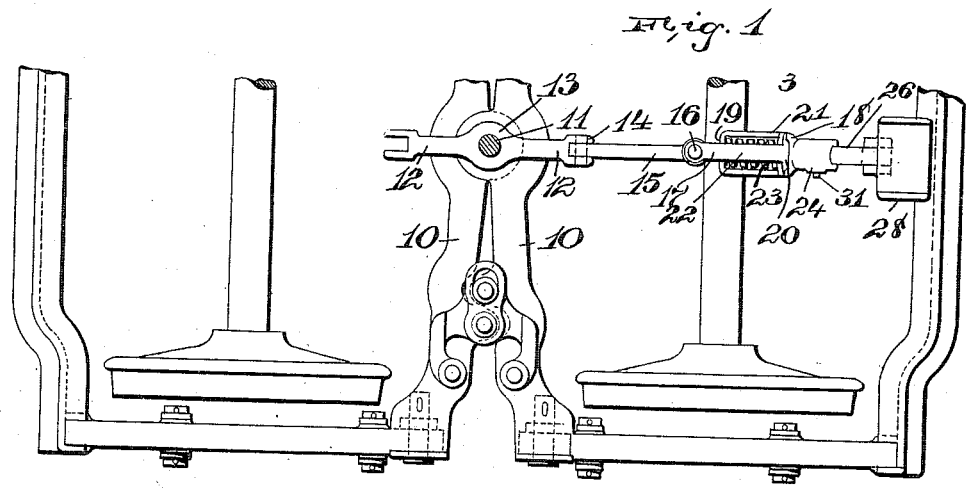
Figure 2:
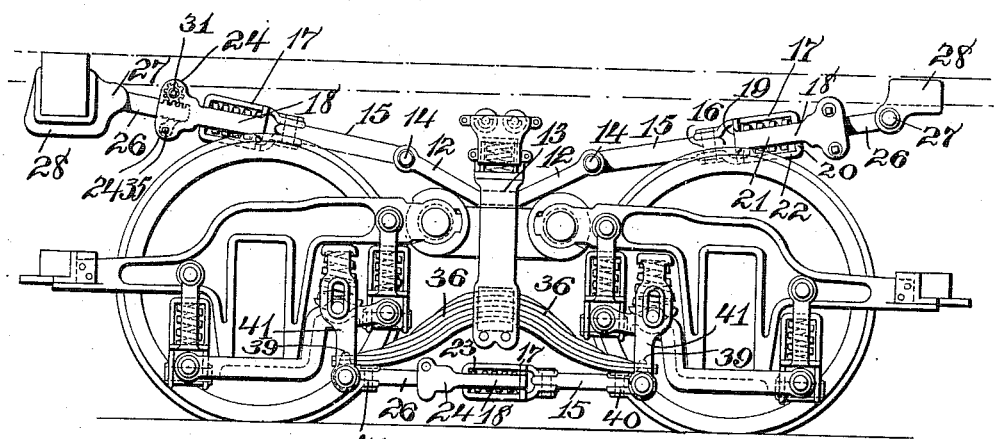
Figure 3:
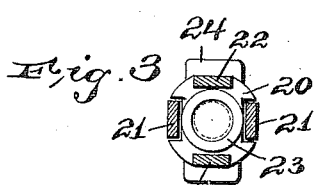
Figure 4:
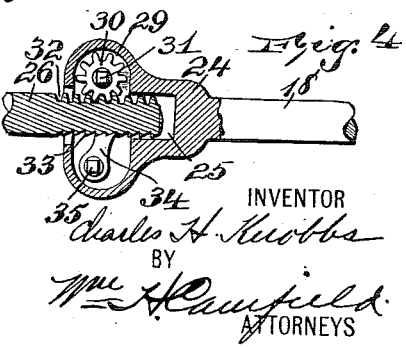

Figure 1 is a top view of a truck with the device installed as a stopping and starting device on one side of the truck. Fig. 2 is a side view of a truck freely equipped with the stopping and starting device extending from both sides of the car bolster. Fig. 3 is an enlarged section on line 3, 3, in Fig. 1. Fig. 4 is a section of the adjusting means, and Fig. 5 is a section showing in detail the means of seating the elliptical spring on its supports.

The device can be used on a truck with a rigid, central bolster, but I have illustrated a radial truck which has the bolster comprised of two members 10 which rock on the pivotal pin 11 which also serves as the pin on which the whole truck swings on the car body. The previous constructions have embodied the car bolster which rests on the truck bolster as the only means of conveying forward and backward motion from the truck to the car body, or from the car body to the truck, depending on whether the car is starting or stopping. In railway cars, when starting or stopping, the tendency is for the car body to force the truck, and in motor driven cars, such as electric cars, in starting, the truck tends to pull on the bolster to twist it. It is to overcome this tendency, and to take the strain from the bolster, that I have devised the present invention.

Extending from each side of the pivotal pin 11 I place the arms 12 which project from the plate 13. Each of these arms is connected to the car by the device to be hereinafter described, and since they are in duplicate, one of them will be described. Pivotally secured, as at 14, to one of the arms 12 so that it can swing vertically, thereby compensating for the vertical movement of the car body, is a rod 15 which has, secured to its end by means of a pivot 16, a yoke 17. This pivotal connection is for the purpose of allowing for the swing of the truck in case the plate 13 and the arms 12 become caught in any way and swing with the truck. The yoke 17 is interlocked with the yoke 18, these yokes having their respective ends 19 and 20 passing between parallel side strips of the other, this being shown more particularly in Fig. 3 where the side strips 31 of the yoke 18 and the side strips 22 of the yoke 17 are illustrated in section. These side strips serve to inclose a spring 23 which abuts on one end on the end plate 19 and on its other end, on the end plate 20 so that the spring has a constant tendency to draw the yokes toward each other, in other words, to cause them to telescope or have a sliding action. The yoke 18 is provided on its end with a head 24, which head is recessed as at 25 to receive a bar 26, which bar is pivoted as at 27 to a suitable securing element 28, by means of which the apparatus is attached to the car body. The head 24 is enlarged on opposite sides of the bar 26 to form a pair of chambers, in one of which, 29, is arranged a pinion 30 which has a projecting head 31 so that it can be turned by a suitable wrench or crank, and in this way operate the rack 32 to tighten up on the spring 23 when it has become weakened, as will be understood. The other side of the bar 26 is provided with ratchet teeth 33, and a pawl 34 is arranged to be placed in contact with the teeth to hold the bar 26 in its adjusted position and take the strain from the pinion 30. The pawl can be swung out of the way by means of the projecting head 35 which can also be operated by a suitable tool. I also use this same device on a truck in a different situation which is shown more particularly in Fig. 2.

Figure 5:
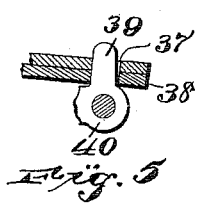

In my style of truck I support the elliptical spring 36, one of which is arranged on each side of the truck, by means of slots 37 which are arranged in the ends 38 of the spring, these slotted ends fitting over a nose 39, shown more particularly in Fig. 5, the nose in each case forming part of a bracket 40, one bracket being arranged at each end of the spring and suspended in any way usual in the art, but I have shown them suspended in the links 41 which in turn are suspended from the truck. To one of the brackets 40 I attach the rod 15, and on the other bracket I secure the bar 26, the securing means between the rod and its bracket and the bar and its bracket being preferably a pivotal one permitting horizontal swinging of the bar and the arm on their respective brackets. The bar 26 and the arm 15 are connected, in this situation, just the same as they were when used as a starting and stopping device, the two yokes 17 and 18 being employed, the spring 23 being used to force them together, and the adjusting mechanism being confined in the head 24, as will be understood. From an inspection of Fig. 2 it will be seen that this device, when used to connect the ends of the spring, has a constant tendency to pull the ends of the spring together and thus assist the spring in maintaining its elliptical shape or curved formation, and overcomes the tendency of the spring to become flattened after some use. It will also be understood that any movement of the car body relative to the truck, or any movement of the truck relative to the car body, will be communicated at once to whichever of the devices is subjected to a tension and the spring in the device effected will take up the strain, and the truck and the body will act more in unison or sympathy than when the car bolster is the only medium for conveying the movement from one to the other. An easier riding car is the result and the maintenance of a car is cheaper, since the car bolsters will not require the constant and frequent attention and straightening they now do when they are the only means of communicating motion from the truck to the body, or vice versa.

Having thus described my invention, what I claim is:—

1. A tension device for car trucks comprising a pair of yokes with their inner ends opposite each other, a spring inclosed by the yokes and abutting on said ends, a rod on the end of one yoke, a head on the second yoke, a bar, and means in the head for engaging the bar and acting to adjust the bar in the head.

2. A tension device for car trucks comprising a pair of yokes with their inner ends opposite each other, a spring inclosed by the yokes and abutting on said ends, a rod on the end of one yoke, a head on the second yoke, a bar, teeth on the bar forming a rack, a pinion in the head and engaging the rack, means for turning the pinion, and a locking device in the head for engaging the bar.

3. A tension device for car trucks comprising a pair of yokes with their inner ends opposite each other, a spring inclosed by the yokes and abutting on said ends, a rod on the end of one yoke, a head on the second yoke, a bar, teeth on the bar forming a rack, a pinion in the head and engaging the rack, means for turning the pinion, a pawl pivoted in the head, and means for swinging the pawl, the bar having ratchet teeth for engaging the pawl.

4. The combination with a car and a car truck, of arms projecting from the car truck toward the front and rear of the car body, bars pivotally secured to the car body, each arm and each bar having a yoke attached thereto, the yokes being interlocking, and a spring arranged between the ends of each pair of interlocking yokes.

5. The combination with a car truck and a car body, of arms projecting toward the front and rear of the car body, said arms being arranged on the car truck, rods, each rod being pivotally secured so as to swing vertically on one of its ends to the end of one of the arms, interlocking yokes arranged on the ends of the rods, a spring in each interlocking pair of yokes, each spring abutting on the ends of the interlocking yokes, and a bar secured to each interlocking pair of yokes, each bar being attached to the car body at its outer end.

6. The combination with a car truck and a car body, of arms projecting toward the front and rear of the car body, said arms being arranged on the car truck, rods, each rod being pivotally secured so as to swing vertically on one of its ends to the end of one of the arms, interlocking yokes arranged on the ends of the rods, a spring in each interlocking pair of yokes, each spring abutting on the ends of the interlocking yokes, a head on each pair of interlocking yokes, bars secured to the car body, and adjusting and locking means in each head adapted to engage a bar for regulating the tension on the springs.

7. The combination with a car body and a car truck, the car body and car truck being in pivotal relation, of a plate arranged at the pivotal connection, the plate having oppositely projecting arms, a pair of interlocking yokes, a spring in each interlocking yoke, rods, each rod being secured to a yoke and arranged to swing vertically in the end of one of the arms, and means for attaching the outer end of each pair of yokes to the car body.

8. The combination with a car body and a car truck, the car body and car truck being in pivotal relation, of a plate arranged at the pivotal connection, the plate having oppositely projecting arms, a pair of interlocking yokes, a spring in each interlocking yoke, rods, each rod being secured to a yoke and arranged to swing vertically in the end of one of the arms, a head on each pair of interlocking yokes, a bar projecting from each head, means for securing each bar to the car body, and means in the head for engaging the bar and acting to adjust the tension on the spring in the interlocking yokes.

9. The combination with a car and a car truck, of arms projecting from the car truck upwardly and toward the front and rear of the car body, and compressible spring connections between the arms and the car body, the spring connections being adapted to take up the starting and stopping strain.

10. The combination with a car and a car truck, of arms projecting from the car truck upwardly and toward the front and rear of the car body, compressible spring connections between the arms and the car body, the spring connections being adapted to take up the starting and stopping strain, and means for regulating the tension of the spring connections.

11. The combination with a car and a car truck in pivotal connection, of arms projecting from the car truck and extending from the pivotal connection upward and toward the front and rear of the car body, compressible spring connections between the arms and the car body, and means for regulating the compression of the spring connection, the spring connection being adapted to take up the strain of the stopping and starting of the car.

In testimony, that I claim the foregoing, I have hereunto set my hand this thirteenth day of July, 1910.

CHARLES H. KNOBBS.

Witnesses:
JAMES A. DOWD,
E. A. PELL.

---

Copies of this patent may be obtained for five cents each, by addressing the "Commissioner of Patents, Washington, D. C."